H. L. SPIEGEL.

Assignor to F. W. Mix.

CASE FOR LOCKS.

No. 10,361. Reissued July 31, 1883.

Witnesses.
John Edwards Jr.
Martin A Pond.

Inventor.
Henry L. Spiegel.
By James Shepard
atty.

N. PETERS, Photo-Lithographer, Washington, D. C.

UNITED STATES PATENT OFFICE.

HENRY L. SPIEGEL, OF INDIANAPOLIS, INDIANA, ASSIGNOR TO FRANK W. MIX, OF NEW BRITAIN, CONNECTICUT.

CASE FOR LOCKS.

SPECIFICATION forming part of Reissued Letters Patent No. 10,361, dated July 31, 1883.

Original No. 241,828, dated May 24, 1881. Application for reissue filed April 28, 1883.

*To all whom it may concern:*

Be it known that I, HENRY L. SPIEGEL, a citizen of the United States, residing at Indianapolis, in the county of Marion and State of Indiana, have invented a new and useful Improvement in Cabinet-Locks, of which the following is a specification.

My invention relates to improvements in cabinet-locks in which the back plate of the lock is made to project on each side and adapted to fit a groove or dovetail formed in the inner surface of the drawer-front; and the object of my improvement is to provide a lock which may be secured in its receptacle without the aid of screws. This object I accomplish by the device illustrated in the accompanying drawings, in which—

Figure 1:
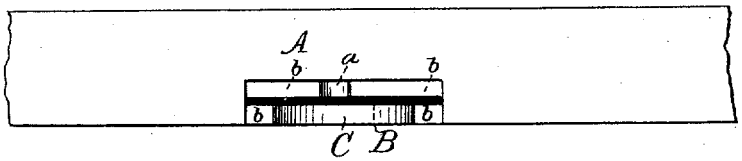
Figure 2:
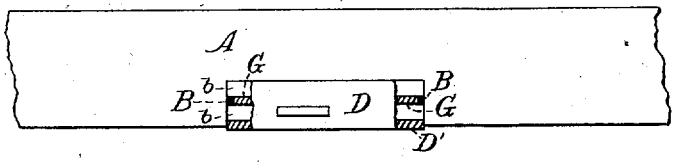
Figure 3:
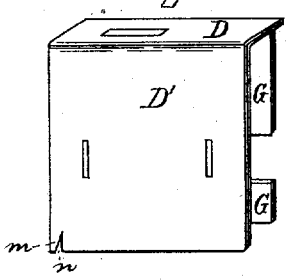
Figure 4:
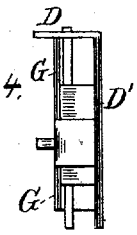
Figure 5:
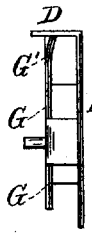

Figure 1 represents a top view of the recess for receiving the lock. Fig. 2 is the same as Fig. 1 with a lock having its top inserted in the recess. A portion of the top or selvage is partially cut away in order to clearly show the method of insertion. Fig. 3 is a perspective view of the lock, showing especially the front plate, the top plate, and one edge of the rear plate. Figs. 4 and 5 are side views.

A represents the upper edge of a drawer-front. *b b* is a shallow mortise for receiving the top plate, D, of the lock. C is a larger recess for receiving the body of the lock. *a* is a vertical recess or groove for the key-stud of the lock to slide in, and B is a shallow groove to receive and hold the locking-plate G of the lock. The lock is of the ordinary pattern, excepting that the back plate projects on each side of the lock-body, as seen at G G, the projections being designed to enter the groove B and hold the lock fast to the drawer-front A by means of the portions of the walls of the mortise which are in front of the locking-plate G and in the rear of the front plate of the lock.

It is obvious that the groove B may be made dovetailed in shape and the edges G of the locking-plate bent to a corresponding angle to fit therein, if desired.

In Fig. 5 the upper part of the edges G G are bent toward the front plate, so that when the lock is inserted and forced down in its recess B C the bent part G′ of the back plate springs back and binds the wood tightly between it and the front plate, D′. The lower corner of the lock-face, Fig. 3, has a slit, *n*, cut in it, forming a thin strip, *m*, at the corner. This thin strip is set into the wood by a hammer when the lock has been forced home, and the lock is thereby held from working out of its receptacle. It will thus be seen that the lock is prevented from lateral displacement by the projections upon the back plate, in combination with the corresponding shape of the mortise, and that it is prevented from vertical displacement by the thin strip *m* and the bent part G′.

Having thus described my invention, what I claim as new therein, and desire to secure by Letters Patent, is—

1. A cabinet-lock having its front plate and rear plate extending laterally beyond the body of the lock, in combination with the mortise, whose walls enter the space between the front and rear plate, whereby fastening-screws are dispensed with, substantially as described.

2. A cabinet-lock having its front plate and rear plate extending laterally beyond the body of the lock, and having also the edge G′ upon the rear plate bent toward the companion plate, substantially as described, and for the purpose specified.

3. A cabinet-lock having the thin strip *m* and the slit *n* at the lower corner of its outer plate, substantially as described, and for the purpose specified.

4. A cabinet-lock having its rear plate projecting beyond each side of the lock-case, as at G G, and having the upper part of each projection bent toward the front plate, D, combined with the front plate, D, said front plate having a slit, *n*, and strip *m*, substantially as and for the purpose specified.

HENRY L. SPIEGEL.

Witnesses:
SYLVESTER C. DUNHAM,
WILLIAM H. MARTZ.